United States Patent
Sung et al.

(10) Patent No.: US 12,513,538 B2
(45) Date of Patent: Dec. 30, 2025

(54) APPARATUS AND METHOD FOR SELECTING TRAINING UE IN A MOBILE COMMUNICATION SYSTEM

(71) Applicant: ELECTRONICS AND TELECOMMUNICATIONS RESEARCH INSTITUTE, Daejeon (KR)

(72) Inventors: Jihoon Sung, Daejeon (KR); Soohwan Lee, Daejeon (KR); Myung Ki Shin, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 379 days.

(21) Appl. No.: 18/099,761

(22) Filed: Jan. 20, 2023

(65) Prior Publication Data

US 2023/0262487 A1 Aug. 17, 2023

(30) Foreign Application Priority Data

| Jan. 21, 2022 | (KR) | 10-2022-0009047 |
| Mar. 28, 2022 | (KR) | 10-2022-0038284 |
| May 6, 2022 | (KR) | 10-2022-0056090 |
| May 20, 2022 | (KR) | 10-2022-0062151 |
| Sep. 21, 2022 | (KR) | 10-2022-0119620 |

(Continued)

(51) Int. Cl.
*H04W 8/18* (2009.01)
*H04W 8/24* (2009.01)
(Continued)

(52) U.S. Cl.
CPC .............. *H04W 24/02* (2013.01); *H04W 8/18* (2013.01); *H04W 8/24* (2013.01); *H04W 24/08* (2013.01);
(Continued)

(58) Field of Classification Search
CPC .......... G06N 20/00–20; H04B 17/0082–3913; H04L 41/14–5096; H04L 43/02–55;
(Continued)

(56) References Cited

U.S. PATENT DOCUMENTS 11,310,731 B1 * 4/2022 Feder .................... H04W 24/10
2021/0390152 A1 12/2021 Jang
(Continued)

FOREIGN PATENT DOCUMENTS

KR 10-2020-0116845 A 10/2020

OTHER PUBLICATIONS

ETRI, "Solution (KI#7): 5GS assistance to selection of UEs for federated learning operation", SA WG2 Meeting #150E e-meeting, S2-2202729, Apr. 6-12, 2022, Elbonia (Year: 2022).*

(Continued)

*Primary Examiner* — Timothy J Weidner
(74) *Attorney, Agent, or Firm* — LRK PATENT LAW FIRM

(57) ABSTRACT

A method and an apparatus for selecting UE through steps of requesting analytics for selecting the UE to participate in an AI/ML operation from an NWDAF in a core network and selecting the UE based on the analytics.

7 Claims, 4 Drawing Sheets

(30) Foreign Application Priority Data

Jan. 9, 2023 (KR) ........................ 10-2023-0003094
Jan. 20, 2023 (KR) ........................ 10-2023-0008985

(51) Int. Cl.
*H04W 24/02* (2009.01)
*H04W 24/08* (2009.01)
*H04W 24/10* (2009.01)
*H04W 84/02* (2009.01)
*H04W 88/18* (2009.01)
*H04W 92/02* (2009.01)

(52) U.S. Cl.
CPC ............ *H04W 24/10* (2013.01); *H04W 84/02* (2013.01); *H04W 88/18* (2013.01); *H04W 92/02* (2013.01)

(58) Field of Classification Search
CPC ... H04W 8/18–245; H04W 16/18–225; H04W 24/02–10; H04W 80/02–12; H04W 84/02–16; H04W 88/005–188; H04W 92/02–24
See application file for complete search history.

(56) References Cited

U.S. PATENT DOCUMENTS

| | | |
|---|---|---|
| 2022/0094607 A1 | 3/2022 | Shin et al. |
| 2022/0108214 A1 | 4/2022 | Lee et al. |
| 2022/0110024 A1* | 4/2022 | Consoli ................ H04W 8/18 |
| 2023/0156522 A1* | 5/2023 | Bashir ................ H04W 24/08 |
| 2023/0199436 A1* | 6/2023 | Duan ................ H04W 24/02 |

OTHER PUBLICATIONS

Martin Isaksson et al., "Secure Federated Learning in 5G Mobile Networks", arXiv:2004.06700v2 [cs.CR] Sep. 14, 2020.
ETRI, "KI#7, Solution#27: Update to remove Editor's notes." SA WG2 Meeting #151E e-meeting, S2-2204025, May 16-20, 2022, Elbonia.
ETRI, "Solution (KI#7): 5GS assistance to selection of UEs for federated learning operation", SA WG2 Meeting #150E e-meeting, S2-2202729, Apr. 6-12, 2022, Elbonia.

* cited by examiner

APPARATUS AND METHOD FOR SELECTING TRAINING UE IN A MOBILE COMMUNICATION SYSTEM

CROSS-REFERENCE TO RELATED APPLICATIONS

This application claims priority to and the benefit of Korean Patent Application No. 10-2022-0009047 filed in the Korean Intellectual Property Office on Jan. 21, 2022, Korean Patent Application No. 10-2022-0038284 filed in the Korean Intellectual Property Office on Mar. 28, 2022, Korean Patent Application No. 10-2022-0056090 filed in the Korean Intellectual Property Office on May 6, 2022, Korean Patent Application No. 10-2022-0062151 filed in the Korean Intellectual Property Office on May 20, 2022, Korean Patent Application No. 10-2022-0119620 filed in the Korean Intellectual Property Office on Sep. 21, 2022, Korean Patent Application No. 10-2023-0003094 filed in the Korean Intellectual Property Office on Jan. 9, 2023, and Korean Patent Application No. 10-2023-0008985 filed in the Korean Intellectual Property Office on Jan. 20, 2023, the entire contents of which are incorporated herein by reference.

BACKGROUND

1. Technical Field

The present disclosure relates to a method and apparatus for selecting a training user terminal for federated learning performed in a mobile communication system.

The present disclosure has been financed by the Korean government (Ministry of Science and ICT) and conducted with the support of "No. 2021-0-02081, Development of Standards for 5G-Advanced Network Intelligence and Automation based on Machine Learning" and "No. 2022-0-00862, Development of Intelligent 6G Mobile Core Network Technologies".

2. Description of Related Art

In a mobile communication system, artificial intelligence-based service is a new type of service that did not exist before. In order for the mobile communication system to provide the artificial intelligence-based service with high quality, it is inevitable to evolve accordingly.

Federated learning is a machine learning technique in which a plurality of terminals perform model training in a distribution manner and then a server collects the models updated after training by each terminal. In order to smoothly provide artificial intelligence service based on federated learning, it is necessary for terminals participating in training to upload the learned model to the server normally. The performance of the models for the federated learning may be deteriorated if a problem occurs, such as the terminals participating in the training not completing the training normally or the normally trained model not being uploaded to the server.

The above information disclosed in this Background section is only for enhancement of understanding of the background of the invention, and therefore it may contain information that does not form the prior art that is already known in this country to a person of ordinary skill in the art.

SUMMARY

Embodiments provide a method for selecting user equipment.

Embodiments provide an NWDAF capable of providing assistance data for AI/ML service.

Embodiments provide a method for providing assistance information for selection of UE.

According to an embodiment, a method for selecting user equipment (UE). The method includes: requesting analytics for selecting the UE participating in artificial intelligence (AI)/machine learning (ML) operation from a network data analytics function (NWDAF) in a core network; and selecting the UE based on the analytics.

In an embodiment, the requesting the analytics may include requesting QoS Sustainability analytics from the NWDAF.

In an embodiment, the requesting the QoS Sustainability analytics from the NWDAF may include transmitting a target of a report of the analytics as a granularity of a UE level to the NWDAF.

In an embodiment, the analytics may include at least one of service experience, UE mobility, UE communication pattern, user data congestion, QoS sustainability, and/or abnormal behavior.

In an embodiment, the requesting the analytics may include requesting the analytics from the NWDAF via an AI/ML assistance NF in the core network.

In an embodiment, the requesting the analytics from the NWDAF via an AI/ML assistance NF in the core network may include requesting the analytics from the NWDAF via one of a first AI/ML assistance NF or a second AI/ML assistance NF when the first AI/ML assistance NF that determines a plurality of AI/ML-related tasks of the AI/ML operation and the second AI/ML assistance NF that proposes candidate AI/ML training members for the AI/ML-related tasks are within the core network.

In an embodiment, the method may further include: transferring a global model of the AI/ML operation to the selected UE; and receiving an update result of local training for the global model from the UE that has received the global model.

In an embodiment, the method may further include collecting information required for the AI/ML operation from at least one UE through a user plane.

In an embodiment, the information required for the AI/ML operation may include at least one of battery charging/consumption pattern, mobility pattern, and/or application usage pattern of the at least one UE.

According to another embodiment, a network data analytics function (NWDAF) in a core network. The NWDAF includes: a processor, a memory, and a communication device, wherein the processor executes a program stored in the memory to perform: receiving a request for analytics in user equipment (UE) level granularity from an application function (AF); collecting data from at least one UE, a network function (NF), and OAM (operations, administration, and maintenance) in the core network; and providing the analytics derived based on the collected data to the AF.

In an embodiment, when collecting the data, the processor may perform collecting RAN Throughput per UE and QoS flow retainability per UE from the OAM.

In an embodiment, when collecting the data, the processor may perform collecting at least one of throughput for downlink (DL) and uplink (UL) per UE, packet delay for the DL and the UL per radio access bearer (RAB)/data radio bearer (DRB) per UE, packet loss rate for the DL and the UL per the RAB/DRB from the OAM at the UE level granularity.

In an embodiment, when collecting the data, the processor may perform collecting quality of experience (QoE) metric about success rate of model distribution or upload success rate of results of local update from the at least one UE.

In an embodiment, when collecting the data, the processor may perform collecting a customized mean opinion score (MOS) about success rate of model distribution or upload success rate of results of local update from the AF.

In an embodiment, when receiving the request for analytics in the UE level granularity from the AF, the processor may perform receiving the request for the analytics from the AF in the core network.

In an embodiment, when providing the analytics derived based on the collected data to the AF, the processor may perform providing the analytics to the AF.

According to yet another embodiment, a method for providing assistance information for selection of user equipment (UE). The method include: transferring a request for analytics with in UE level granularity to a network data analytics function (NWDAF) in a core network when the analytics is requested from an application function (AF), and transferring the assistance information collected from at least one UE and a network function (NF) of the core network and the analytics received from the NWDAF to the AF.

In an embodiment, the transferring the request for the analytics to the NWDAF may include confirming a UE that has agreed to participate in an artificial intelligence (AI)/machine learning (ML) operation based on subscription information stored in a unified data management function (UDM).

In an embodiment, the transferring the request for the analytics to the NWDAF may include transmitting information of the UE that has agreed to participate in the AI/ML operation to the NWDAF as a target of the analytics.

DETAILED DESCRIPTION OF THE EMBODIMENTS

Figure 1:
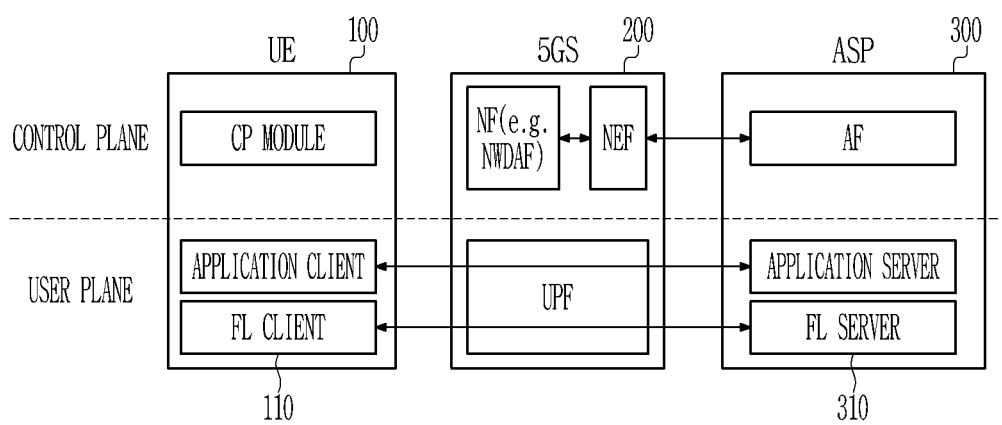
FIG. 1 is a block diagram illustrating a system for AI/ML operations according to an embodiment.

In the following detailed description, only certain embodiments of the present invention have been shown and described in detail with reference to the accompanying drawing, simply by way of illustration. However, the present disclosure may be implemented in various different forms and is not limited to the embodiments described herein. Further, in order to clearly describe the description in the drawing, parts not related to the description are omitted, and similar reference numerals are attached to similar parts throughout the specification.

Throughout the specification, user equipment (UE) may be called a terminal, a mobile station (MS), a mobile terminal (MT), an advanced mobile station (AMS), a high reliability mobile station (HR-MS), a subscriber station (SS), a portable subscriber station (PSS), an access terminal (AT), a machine type communication device (MTC device), and the like and may also include all or some of the functions of the MS, the MT, the AMS, the HR-MS, the SS, the PSS, the AT, the UE, the MTCH device, and the like.

Further, the base station (BS) may be called an advanced base station (ABS), a high reliability base station (HR-BS), a node B, an evolved node B (eNodeB), an access point (AP), a radio access station (RAS), a base transceiver station (BTS), a mobile multi-hop relay (MMR)-BS, a relay station (RS) serving as a base station, a relay node (RN) serving as a base station, an advanced relay station (RS) serving as a base station, a high reliability relay station (HR-RS) serving as a base station, small base stations (a femto base station (femto BS), a home node B (HNB), a home eNodeB (HeNB), a pico base station (pico BS), a macro base station (macro BS), a micro base station (micro BS), and the like), and the like and may also include all or some of the functions of the ABS, the node B, the eNodeB, the AP, the RAS, the BTS, the MMR-BS, the RS, the RN, the ARS, the HR-RS, the small base stations, and the like.

In this specification, unless explicitly described to the contrary, the word "comprises", and variations such as "including" or "containing", will be understood to imply the inclusion of stated elements but not the exclusion of any other elements.

In this specification, expressions described in singular can be interpreted as singular or plural unless explicit expressions such as "one" or "single" are used.

As used herein, "A or B", "at least one of A and B", "at least one of A or B", "A, B, or C", "at least one of A, B, and C", and "at least one of A, B, or C" each may include any one of, or all possible combinations of, items listed together in the corresponding one of the phrases.

In this specification, "and/or" includes all combinations of each and at least one of the mentioned elements.

In this specification, terms including ordinal numbers such as first and second may be used to describe various configurations elements, but the elements are not limited by the terms. The terms may be only used to distinguish one element from another element. For example, a first element may be named a second element without departing from the right range of the present disclosure, and similarly, a second element may be named a first element.

In the flowchart described with reference to the drawings in this specification, the order of the operations may be changed, several operations may be merged, certain operations may be divided, and specific operations may not be performed.

FIG. 1 is a block diagram illustrating a system for AI/ML operations according to an embodiment.

In this disclosure, a method for supporting artificial intelligence (AI)/machine learning (ML) services over federated learning (FL) in a 5G system (5GS) may be provided.

In the FL, if a UE to be expected not to complete training is selected as a training device, the performance of the aggregated model is more likely to be poor. Therefore, it may be necessary for reliable model training that UEs which are less likely to complete the training are excluded from the training devices.

This description may provide a method for selecting training Ues for reliable model training over the FL in the 5GS. In this description, a method for analyzing network data by the NWDAF for selection of training Ues for reliable FL and a method for exchanging messages among involved NFs or entities such as an NF consumer (e.g., application function (AF)), an NWDAF, and an OAM (operations, administration, and maintenance) to support reliable FL can be provided.

The method for selecting training UE according to an embodiment may be applied to a scenario in which users use an AI/ML service on their devices via the 5GS in their daily life and allows their devices to participate as the training device in the training phase.

In an embodiment, the method for selecting the training UE may be applied to federated learning in which a plurality of locally distributed devices perform local training and upload updates of the local training to the server. Alternatively, the method for selecting the training UE may be applied to AI/ML operation splitting between AI/ML entities. Alternatively, the method for selecting the training UE according to an embodiment may be applied to other applications requiring terminal selection other than the AI/ML service. The 5GS may provide intelligent operation for the AI/ML service.

Referring to FIG. 1, UE 100, 5GS 200, and application service provider (ASP) 300 may perform the federated learning.

The FL server 310 in the ASP 300 may manage and control the overall model training tasks by provisioning a global model to the distributed devices for local update and aggregating the locally updated model from each device. The FL client 110 in the UE 100 may receive the global model from the FL server, perform the local update, and deliver the updated model to the FL server 310.

Application server in the ASP 300 may transmit/receive data traffic for the application service. The application client of the UE 100 may transmit/receive the data traffic with the application server for the application service.

The application client and FL client 110 in the UE 100 and the application server and FL server 310 of the ASP 300 may communicate through a user plane (UP) in the 5GS 200.

Server-client communication in the user plane of the 5GS 200 may be supported by control of a control plane (CP) such as protocol data unit (PDU) session establishments. In an embodiment, in order to provide better FL-based AI/ML services, the function of the 5GS 200 needs to be enhanced in the CP side in that the CP plays a role to control the UP.

The 5GS 200 may provide better service quality by providing internal network data of the 5GS 200 via network exposure function (NEF) with external a 3rd party (e.g., ASP). In the embodiment of FIG. 1, the FL service may be sophisticatedly controlled through the network exposure function.

In an embodiment of the CP operation, the NWDAF may provide several analytics in a UE-level granularity such as QoS sustainability, service experience to help select the training UEs for the reliable FL model training based on network data collected from several NFs. In an embodiment, provision of the UE-level QoS sustainability may be initiated by a request of the $3^{rd}$ party AF, described in detail below.

Figure 2:
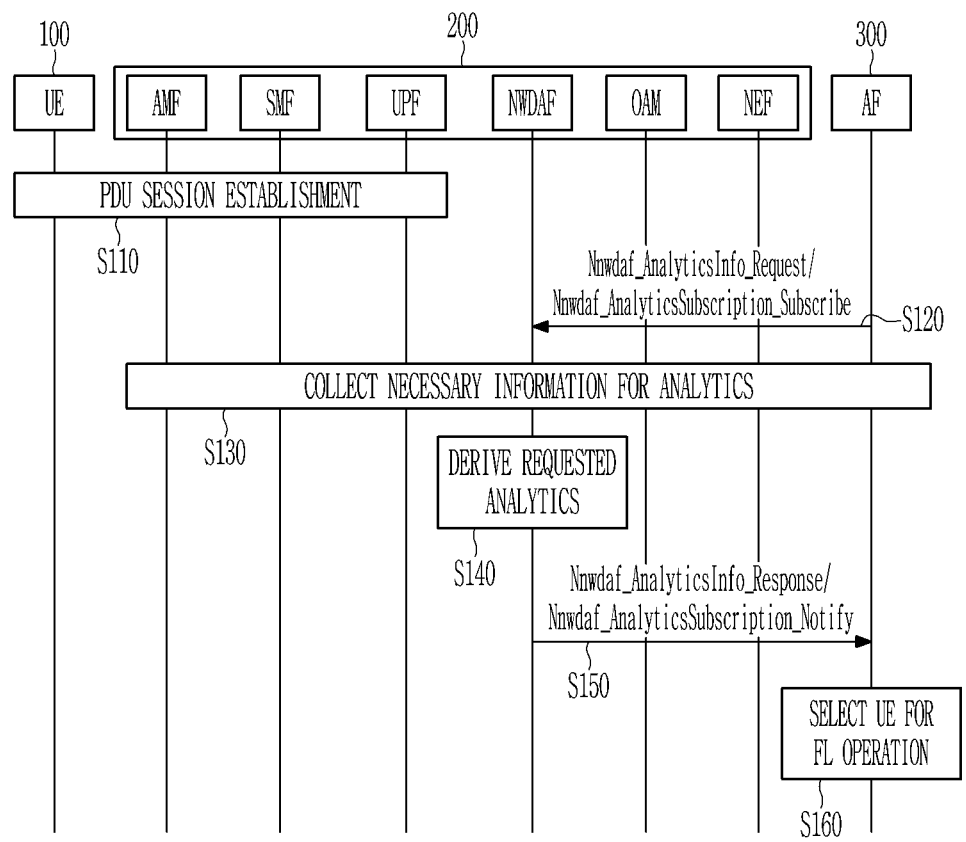
FIG. 2 is a flowchart illustrating a procedure of an AI/ML service via the 5GS according to an embodiment.

FIG. 2 is a flowchart illustrating a procedure of an AI/ML service via the 5GS according to an embodiment.

Referring to FIG. 2. the UE 100 may establish a PDU session to an application server of the ASP 300 that provides an AI/ML application service to be used (S110). The application server may trigger the UE 100 that provides consent to establish a new PDU session to the FL server 310 via the user plane.

When the trigger is received, the UE 100 may establish a new PDU session to the FL server 310 to play a dedicated role in the training tasks. The FL server 310 or ASP 300 may collect data (e.g., computation and network capability and data characteristic) required for the training from the UE 100 via the established PDU session.

An AF (that is, AF owned by the ASP 300) may request analytics from the NWDAF (Nnwdaf_AnalyticsInfo_Request service operation) or subscribe to analytics of the NWDAF (Nnwdaf_AnalyticsSubscription_Subscribe service operation) to collect analytics about UE of interest (S120). The analytics about the UE of interest may include at least one of service experience, UE mobility, UE communication, user data congestion, QoS sustainability, and/or abnormal behavior. When the AF is an untrusted device or an entity within an untrusted domain, the NEF within the 5GS 200 may be used.

The NWDAF may collect information necessary for analysis from the NFs and/or the OAM in the 5GS 200 (S130). Here, the NF providing information to the NWDAF may include at least one of an access and mobility management function (AMF), a session management function (SMF), a user plane function (UPF), and/or an application functions (AF).

For example, if an analytics ID collected for reliable FL model learning is 'QoS Sustainability', the output of analytics at the UE-level may be required, and thus the UE-level data needs to be collected from the OAM. The UE-level QoS sustainability is described in detail below.

An analytics consumer (e.g., AF) may request NWDAF analytics with several parameters to define a target to be analyzed. For the 'QoS Sustainability' analytics, the consumer device may request the analytics regarding past statistics or future predictions on QoS sustainability or changes during a target period for a specific area of interest (e.g., TAI (Tracking Area Identity) or cells). In an embodiment, the analytics target needs to be provided with UE-level granularity for reliable FL model training. This is because at least one training task is performed by each UE, and thus the performance of the model may be directly related to whether the training task by each UE is completed.

In an embodiment, the consumer device may request the QoS sustainability analytics from the NWDAF to select the UE of the FL operation. When the consumer device requests the QoS sustainability analytics from the NWDAF, the consumer device may provide a target of analytics report as an input parameter. The target of the analytics may include the UE-level granularity, and in this case, the consumer device may not provide the location information of the UE to the NWDAF as information related to the target of the analytics report. In order to provide analytics at the UE-level granularity, data collected from the OAM by the NWADAF may include RAN Throughput per UE and QoS flow Retainability per UE. Supportable QoS levels from some UEs in the same area (same TAI or cell ID) may be different from each other, and therefore, the target of analytics may be provided as the UE-level granularity so that unreliable prediction information is not provided to support the FL operation.

In an embodiment, data that the NWDAF collects from the OAM to provide the QoS sustainability analytics to the consumer devices is shown in Table 1 below.

TABLE 1

| Information | Source | Description |
| --- | --- | --- |
| RAN UE Throughput | OAM | Average bitrate (e.g. Payload data volume on RLC level per elapsed time unit on the air interface, for transfers restricted by the air interface) per UE |

TABLE 1-continued

| Information | Source | Description |
| --- | --- | --- |
| QoS flow Retainability | OAM | Number of abnormally released QoS flows during the time the QoS Flows were used per UE |

The reporting thresholds may be a metric for the QoS flow retainability for 5QI (5G QOS Identifier) of GBR (Guaranteed Bit Rate) resource type. Also, the reporting thresholds may be a metric for the RAN UE Throughput for 5QI of non-GBR resource type.

In an embodiment, in order to provide analytics (e.g., QoS sustainability) with the consumer devices for selecting UEs in the FL operation, the NWDAF may collect at least one of throughput for downlink (DL) and uplink (UL) per UE, packet delay for the DL and the UL per radio access bearer (RAB)/data radio bearer (DRB) per UE, packet loss rate for the DL and the UL per the RAB/DRB (i.e., information in the UE-level granularity) from the OAM. That is, measurement data at the UE-level granularity, such as the throughput for the DL and UL, the packet delay for the DL and UL per RAB/DRB, and the packet loss rate for the DL and UL per RAB/DRB for an individual UE, may be collected from the OAM by the NWDAF through a drive test (e.g., minimization of drive test, MDT).

In an embodiment, QoS sustainability statistics among the analytics output to the consumer devices are shown in Table 2 below.

TABLE 2

| Information | Description |
| --- | --- |
| List of QoS sustainability Analytics (1, . . . , max) | |
| >Applicable Area or UE | Applicable Area if Target of Analytics Reporting is "any UE": A list of TAIs or Cell IDs within the Location information that the analytics applies to Applicable UE if Target of Analytics Reporting is "a UE": a UE, e.g. SUPI (Subscription Permanent Identifier) |
| >Applicable Time Period | The time period within the Analytics target period that the analytics applies to. |
| >Crossed Reporting Threshold(s) | The Reporting Threshold(s) that are met or exceeded by the statistics value or the expected value of the QoS KPI. |

In an embodiment, QoS sustainability predictions among the analytics output to the consumer devices are shown in Table 3 below.

TABLE 3

| Information | Description |
| --- | --- |
| List of QoS sustainability Analytics (1, . . . , max) | |
| >Applicable Area or UE | Applicable Area if Target of Analytics Reporting is "any UE": A list of TAIs or Cell IDs within the Location information that the analytics applies to Applicable UE if Target of Analytics Reporting is "a UE": a UE, e.g. SUPI |

TABLE 3-continued

| Information | Description |
| --- | --- |
| >Applicable Time Period | The time period within the Analytics target period that the analytics applies to. |
| >Crossed Reporting Threshold(s) | The Reporting Threshold(s) that are met or exceeded by the statistics value or the expected value of the QoS KPI. |
| >Confidence | Confidence of the prediction. |

In an embodiment, the consumer device may request service experience analytics from the NWDAF in order to select a UE of the FL operation. When the consumer device requests the service experience analytics from the NWDAF, in order to support the FL as a new AI/ML service type, the NWDAF may collect a customized mean opinion score (MOS) or a quality of experience (QoE) metric about success rate of model distribution or upload success rate of results of local updates from the UE and AF.

Here, the model may be distributed from the AF to the UE during a predetermined interval, and the success rate of the model distribution may be measured by the AF as the customized MOS or measured by the UE as the QoE metric and then provided to the NWDAF. The AF may use an ACK received from the UE, corresponding to the model distribution, to measure the customized MOS for the success rate of the model distribution.

The results of the local update for the distributed model may be uploaded from the UE to the AF during a predetermined interval, and the upload success rate of the results of the local update may be measured as the customized MOS by the AF or measured as the QoE metric by the UE and then provided to the NWDAF. The UE may use an ACK received from the AF, corresponding to the upload of the results of the local update to measure the QoE metric for the upload success rate of the results of the local update.

The NWDAF may check trigger conditions for the analytics and derive the requested analytics (S140).

For example, if the analytics ID for training of the reliable FL model is 'QoS Sustainability', the UE-level analytics may be derived as described below. The NWDAF may provide a response or notification regarding the requested analytics to the AF (S150). For example, if the analytics ID for training of the reliable FL model is 'QOS Sustainability', the UE-level analytics output may be provided to the AF.

Based on the response or notification regarding the analytics provided by the NWDAF, the FL server 310 or the AF of the ASP 300 may select or reselect the UE for the reliable FL operation (S160). After that, the FL server or the AF may distribute or redistribute the global model to the selected UE through the UP and may update the global model by aggregating the update results of the local training from the UE.

AF may trigger release of a PDU session with a UE that has been classified as unreliable based on some conditions. Here, for example, some conditions may be defined by the output or history of a single QoS sustainability analytics. In addition, the AF may trigger establishment of a new PDU session between a UE not participating in the training and the FL server to find a new training UE. For example, when more training UEs are needed because only a small number of UEs have participated in the training, the AF may trigger the establishment of the new PDU session.

Thereafter, S120 to S160 may be repeated whenever the AF requests a new analytics.

Figure 3:
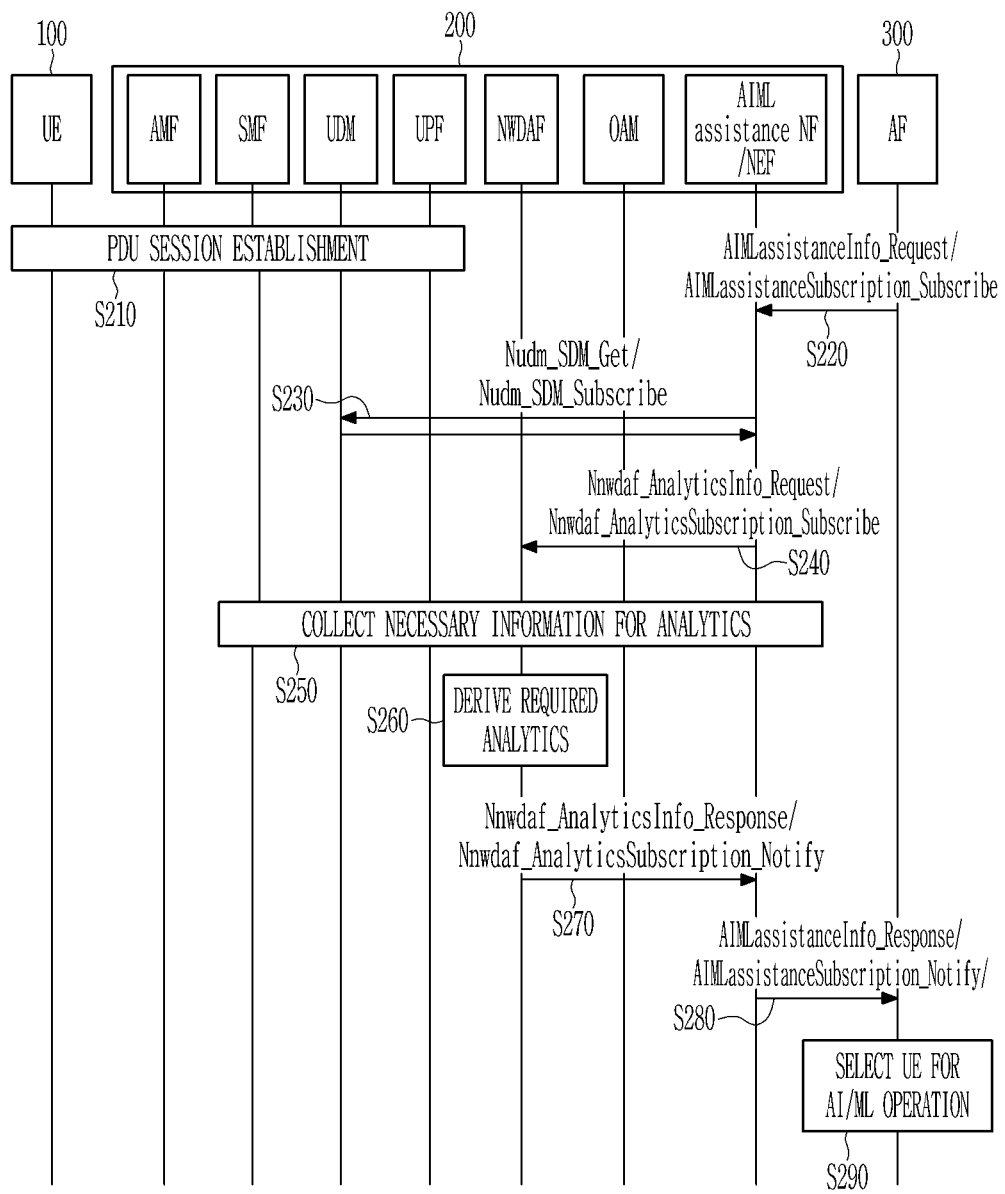
FIG. 3 is a flowchart illustrating a method of providing an AI/ML service through the 5GS according to an embodiment.

FIG. 3 is a flowchart illustrating a method of providing an AI/ML service through the 5GS according to an embodiment.

Referring to FIG. 3, the UE 100 may establish a PDU session to the ASP 300 application server (S210). The application server may trigger the UE 100 that provides consent to establish a new PDU session to the AI/ML server (e.g., FL server) via the user plane. When the trigger is received, the UE 100 may establish the new PDU session to the AI/ML server. Afterwards, the AI/ML server may play a dedicated role for the AI/ML model training through the new PDU session.

The AI/ML server can collect information necessary for the AI/ML model training (or the AI/ML operation or the AI/ML service) from the UE through the user plane. The necessary Information for the AI/ML model training may include at least one of the battery charge/consumption pattern of the UE, UE mobility pattern, and/or application usage pattern. The UE may provide the AI/ML server with consent for the collection of information necessary for the AI/ML model training and the use of personal information. The AI/ML server may collect information necessary for the AI/ML model training from the UE before starting the AI/ML operation such as selecting a candidate AI/ML training member.

The AF (i.e., control plane (CP) in the ASP 300) may request or subscribe analytics to the AI/ML assistance NF or NEF in the core network (e.g., 5G core (5GC)) as AI/ML assistance information (S220).

The AI/ML assistance information may include at least one of service experience, UE mobility, UE communication, user data congestion, QoS sustainability, and/or abnormal behavior. The AI/ML assistance information may include at least one of requirements and/or filtering information related to the target AI/ML operation, such as QoS requirements, UE list, area of interest, expected AI/ML operation period, etc. as an input parameter for requesting or subscribing to the AI/ML assistance information. The NEF may be used when the AF is an untrusted device or in an untrusted domain, and the AI/ML assistance NF may be used both when the AF is trusted or untrusted.

In an embodiment, the AI/ML assistance NF may determine a plurality of the AI/ML-related tasks (type 1) or suggest to the AF candidate AI/ML training members of the AI/ML-related tasks (type 2).

When the AI/ML assistance NF determines a plurality of the AI/ML-related tasks, the AI/ML-related tasks that can be determined by the AI/ML assistance NF may include selection/change of the AI/ML members and recommendation/change of the duration of the AI/ML operation. As the AI/ML assistance NF determines a plurality of the AI/ML related tasks, the overhead caused by the AI/ML operations at AF can be reduced.

Alternatively, the AI/ML assistance NF may propose a candidate AI/ML training member of the AI/ML related task to the AF, and then the AF may determine the AI/ML training member based on the proposed candidate AI/ML training member. At this time, the overhead added to the AF for AI/ML operations may increase, but the AF can determine more parts of the AI/ML operation.

Referring to FIG. 3, the AI/ML assistance NF or the NEF may check, based on subscription information in the UDM, whether each UE consents to participate in the AI/ML operation (S230). That is, the AI/ML assistance NF or NEF can check the UE that has agreed to participate in the AI/ML operation based on the subscription information stored in the UDM. In an embodiment, the AF in the trusted domain may check the UE consent based on the subscription information in the UDM.

In an embodiment, the AI/ML assistance NF or the NEF may execute Nudm_SDM_Get service operation to check the subscription information in the UDM. The NF may subscribe to notification about a change in the subscription information using a Nudm_SDM_Subscribe service operation.

The AI/ML assistance NF or the NEF may request analytics from the NWDAF or subscribe to the analytics of the NWDAF to collect UE-related information (S240). The AI/ML assistance NF or the NEF may request or subscribe to UE-level analytics for UEs for which consents to participate in the AI/ML operation have been confirmed. The UE-related information may include at least one of UE mobility, UE communication pattern, Service Experience, and QoS sustainability. The NEF may be used when the AF is an untrusted device or is in an untrusted domain. In an embodiment, the AF in the trusted domain may request the analytics from the NWDAF or subscribe to the analytics of the NWDAF to collect the UE-related information.

The AI/ML assistance NFs may subscribe to events from each NF (e.g., the AMF, the SMF, the UDM, etc.) to collect the UE-related information. In an embodiment, the AF in the trusted domain may subscribe to the events from NFs to collect the UE-related information.

The NWDAF may collect data necessary for analysis from the AMF, the SMF, the UPF, and/or the OAM (S250).

The NWDAF may check the trigger condition for the analytics and derive the requested analytics (S260). The NWDAF may also detect notification conditions (e.g., which can be defined by reporting thresholds).

The NWDAF may provide a response or notification regarding the requested analytics to the AI/ML assistance NF or the NEF (S270). The AI/ML assistance NF or the NEF may process or manipulate the collected information before the collected information is responded to or notified to the AF.

The AI/ML assistance NF or the NEF may provide a response or notification to the AF as the assistive information (S280). In an embodiment, the AF in the trusted domain may receive the response or notification regarding the requested analytics from the NWDAF.

Based on the response or notification about the analytics provided by the NWDAF, the AF may select or reselect a UE to perform the AI/ML operation (S290). After that, the AF may distribute or redistribute the global model to the selected UE through the UP and may update the global model by aggregating the update results of the local training from the selected UE.

The AF may trigger the release of the PDU session with a UE that has been classified as unreliable according to some conditions. Some conditions for the classification about unreliability may be defined by, for example, output or history of a single QoS sustainability analytics. Also, the AF may trigger establishment of a new PDU session between a UE not participating in the training and the FL server to find a new training UE. For example, when more training UEs are needed because only a small number of UEs have participated in the training, the AF may trigger the establishment of the new PDU session.

Thereafter, S230 to S290 may be repeated whenever the AF requests a new analytics.

In an embodiment, incentives or rewards may be provided to UEs involved in the training tasks to encourage active participation in the AI/ML operations. The following factors may be considered to measure the incentives via the UP or the CP.

Time taken for UE to update training result after being triggered by the AF

Frequency of completing assigned training tasks and uploading training results to the AF by UE complexity of assigned training tasks (measured in terms of computational complexity)

In addition, appropriate policy and charging control (PCC) rules may be provisioned for UEs participating in the AI/ML operations for more reliable or better AI/ML service performance. The PCF may be involved in the relevant operations such as modifying PCC rules based on measured information and the PCF may trigger Qos monitoring after modification of the PCC rule.

According to the embodiments, when aggregating local updates of the models trained by distributed UEs without significant failures, the AI/ML services can be provided efficiently by increasing the reliability of trained models.

In an embodiment, the core network of the mobile communication system may provide selection assistance functionality of a new training UE (new member). The core network may provide the selection assistance functionality to transmit a list of candidate UEs and additional information to the AF when a request is received from the AF.

The selection assistance functionality of the training UE may be hosted by the NEF in both the untrusted AF case and the trusted AF case. If the selection assistance functionality of the training UE is not provided inside the core network, the AF itself may select the training UE through an existing service operation.

In the case of untrusted AF and trusted AF, the AF may send a list of interested UEs to the core network as part of the request for service operation, and the core network may send the list of candidate UEs to the AF as a response to the request for service operation. The AF may select the training UE from the list of candidate UEs by using the additional information. The additional information may include factors about UE reliability as a training device, a UE location, and time zone information suitable for satisfying QoS required by the AF. The additional information may be determined based on statistics or predictions for abnormal behavior or stationary indications provided by the NWDAF.

In an embodiment, in the case of untrusted AF, the NEF may be enhanced to receive the request from the AF including the list of interested UEs and also forward the response to the AF including the list of candidate UEs and the additional information.

In addition, when analytics for the selection assistance of the member (i.e., the training UE) is provided by the NWDAF, the output of the analytics for the member selection assistance (e.g., UE latency performance analytics) may be indicated in the form of percentile ranking. The percentile ranking may be one way to identify each candidate UE. For example, if UE is expressed as high, medium, or low in the statistics or prediction provided by the NWDAF, the AF may select the UE marked as high as the final member for the federated learning operation. When member selection assistance functionality is not supported in the core network, the AF may directly request a service operation needed to collect analytics and events from the core network to find a candidate UE and receive a response to the request.

The following describes UE-related analytics that can be provided by the NWDAF.

The NWDAF may provide at least one of UE mobility analytics, UE communication analytics, expected UE behavioral parameters related to network data analytics, abnormal behavior related network data analytics, and UE latency performance analytics to a NWDAF service consumer (e.g., AF) as the UE-related analytics.

The NWDAF service consumers may request for the analytics separately, or in a combined way. For example, the NWDAF service consumer may receive, from the NWDAF, the expected UE behavior parameters for a group of UEs or a specific UE by requesting the analytics for both UE mobility and UE communication.

In an embodiment, the NWDAF may retrieve user consent for the UE with the UDM prior to data collection for the analytics. If the user consent to collect data is not granted by the UE, the NWDAF may reject or cancel any analytics subscriptions to any of the UE-related analytics. A target UE for UE-related analytics may be set by the SUPI or GPSI of the corresponding UE. If the target of the analytics is either an internal or external group ID or a list of SUPIs or "any UE", the NWDAF may skip the SUPIs for which user consent for the purpose of the analytics or model training is not granted.

In an embodiment, to support application AI/ML operation in the core network of the cellular system (e.g., 5GC), the NWDAF may perform data analytics on UE latency performance and provide the analytics results to an AF. The service consumer may be an NF (e.g., NEF, AF). The consumers of these analytics may indicate the following in the request or subscription.

Analytics ID="UE Latency Performance".
Target of Analytics Reporting: a single UE (SUPI), a list or a group of UEs (an Internal Group ID).
Analytics Filter Information: including single-network slice selection assistance information (S-NSSAI), data network name (DNN), Application ID, area of interest, and an optional list of requested analytics subsets.
Analytics target period: may indicate a time period over which the statistics or predictions are requested.
Preferred level of accuracy of the analytics
Optional preferred order of results for list of the UE latency performance: ordering criterion: "latency performance" and order: ascending or descending.
Optionally, Reporting Thresholds: may be applied for subscriptions and may indicate conditions on a level to be reached for respective analytics subsets in order to be notified by the NWDAF.
Optionally, the maximum number of objects
In a subscription, the Notification Correlation ID and Notification Target Address may be included.

In order to produce the "UE latency performance" analytics, the NWDAF may collect performance data from the AF, network data from the NF in the core network for the Target of Analytics Reporting, and/or Performance measurement data from the OAM. In addition, the NWDAF may collect UE level network data listed in Table 4 below from the OAM. Table 4 below shows UE level network data that can be collected from the OAM.

TABLE 4

| Information | Source | Description |
|---|---|---|
| Timestamp | OAM | A time stamp associated with the collected information. |
| Reference Signal Received Power | OAM (see NOTE 1) | The per UE measurement of the received power level in a network cell, including SS-RSRP, CSI-RSRP as specified in clause 5.5 of TS 38.331 [14] and E-UTRA RSRP as specified in clause 5.5.5 of TS 36.331 [15] |

TABLE 4-continued

| Information | Source | Description |
|---|---|---|
| Reference Signal Received Quality | OAM (see NOTE 1) | The per UE measurement of the received quality in a network cell, including SS-RSRQ, CSI-RSRQ as specified in clause 5.5 of TS 38.331 [14] and E-UTRA RSRQ as specified in clause 5.5.5 of TS 36.331 [15] |
| Signal-to-noise and interference ratio | OAM (see NOTE 1) | The per UE measurement of the received signal to noise and interference ratio in a network cell, including SS-SINR, CSI-SINR, E-UTRA RS-SINR, as specified in clause 5.1 of TS 38.215 [12] |
| RAN Throughput for DL and UL | OAM (see NOTE 1) | The per UE measurement of the throughput for DL and UL as specified in clauses 5.2.1.1 and 5.4.1.1 of TS 37.320 [20] |
| RAN Packet delay for DL and UL | OAM (see NOTE 1) | The per UE measurement of the packet delay for DL and UL, including per QCI per UE packet delay as specified in clauses 5.2.1.1 of TS 37.320 [20] and per DRB per UE packet delay as specified in clauses 5.4.1.1 of TS 37.320 [20] |
| RAN Packet loss rate for DL and UL | OAM (see NOTE 1) | The per UE measurement of the packet loss rate for DL and UL, including the per QCI per UE packet loss rate as specified in clauses 5.2.1.1 of TS 37.320 [20] and the per DRB per UE packet loss rate as specified in clauses 5.4.1.1 of TS 37.320 [20] |

NOTE 1:
Per UE measurement for a specific UE from OAM (via MDT), is as captured in clause 6.2.3.1.

The NWDAF may subscribe to network data from the OAM in Table 4 by using the services provided by the OAM.

The NWDAF supporting the UE latency performance analytics may provide the result of the analytics to the consumer NF. The results of the analytics provided by the NWDAF may include UE latency performance statistics and/or UE latency performance predictions. Table 5 shows UE latency performance statistics and Table 6 shows UE latency performance predictions.

TABLE 5

| Information | Description |
|---|---|
| Time slot entry (1 . . . max) | List of time slots during the Analytics target period. |
| > Time slot start | Time slot start within the Analytics target period. |
| > Duration | Duration of the time slot (average and variance). |
| UE latency performances (1 . . . max) | List of latency performance per UE Max. is the number of UEs, if applicable. |
| > Application ID | Identifies the application in use during the time slot |
| > DNAI | Identifier of a user plane access to one or more DN(s) where applications are deployed as defined in TS 23.501 [2]. |
| > UE location | Indicating the UE location information when the UE service is delivered. |
| > DNN | DNN for the PDU Session which contains the QoS flow. |
| > S-NSSAI | Identifies the Network Slice used to access the Application. |
| > Validity period | The validity period for the UE latency performance statistics as defined in clause 6.1.3. |
| > Spatial validity | Area where the UE latency performance statistics applies |
| > Latency Performance | Latency Performance indicators Statistics of UE latency performance over the Analytics target period (e.g. average, variance). This information refers to a time delay for completing the transmission of a specific data volume from UE to AF, or from AF to UE. If an expected number of repeating data transmissions or an expected time interval between data transmissions is given in the request, the UE transmission latency performance can be provided as an average value of every data transmission latency performance within the Analytics target period, which is also provided in the request. |
| >> UL packet delay (NOTE 2) | The UL packet delay for the UE communicating with the application (e.g. average, variance). |
| >> DL packet delay (NOTE 2) | The DL packet delay for the UE communicating with the application (e.g. average, variance). |
| >> Round trip packet delay (NOTE 2) | The round trip packet delay for the UE communicating with the application (e.g. average, variance). |
| Aggregate latency performances (NOTE 2) | Aggregated latency performance statistics for multiple UEs |

TABLE 5-continued

| Information | Description |
| --- | --- |
| > Latency classes (1 . . . max) (NOTE 3) | List with group of UEs classified by ranges of latency performance |
| >> Ratio/percentage of UEs per latency class | Percentage or ratio of UEs |
| >> Aggregate UL/DL/round trip packet delay per latency class | Aggregated statistical values of the corresponding UE latency statistics in the latency class (e.g. average, variance). |
| > Validity period | The validity period for the UE latency performance statistics as defined in clause 6.1.3. |
| > Geographical distribution of the UE(s) | If requested, a list of UEs per location information |
| > Maximum Packet Delay (NOTE 2) | Maximum packet delay for observed for UEs communicating with the application. |
| > Spatial Validity Condition | Area where the UE latency performance analytics applies. |

NOTE 1:
The item "Serving anchor UPF info" shall not be included if the consumer NF is an AF.

NOTE 2:
Analytics subset that can be used in "list of analytics subsets that are requested", "Preferred level of accuracy per analytics subset" and "Reporting Thresholds".

NOTE 3:
The number of latency classes may be pre-configured by the operator or provided by the service consumer via reporting thresholds.

TABLE 6

| Information | Description |
| --- | --- |
| Time slot entry (1 . . . max) | List of time slots during the Analytics target period. |
| > Time slot start | Time slot start within the Analytics target period. |
| > Duration | Duration of the time slot (average and variance). |
| UE latency performances (1 . . . max) | List of transmission latency performance per UE. Max. is the number of UEs, if applicable. |
| > Application ID | Identifies the application in use during the time slot |
| > Application Server Instance Address | Identifies the Application Server Instance (IP address/FQDN of the Application Server). |
| > Serving anchor UPF info (NOTE 1) | The UPF ID/address/FQDN information for the involved anchor UPF. |
| > DNAI | Identifier of a user plane access to one or more DN(s) where applications are deployed as defined in TS 23.501 [2]. |
| > UE location | Indicating the UE location information when the UE service is delivered. |
| > DNN | DNN for the PDU Session which contains the QoS flow. |
| > S-NSSAI | Identifies the Network Slice used to access the Application. |
| > Validity period | The validity period for the UE latency performance statistics as defined in clause 6.1.3. |
| > Spatial validity | Area where the UE latency performance statistics applies |
| > Latency performance | Latency Performance indicators Predictions of UE transmission latency performance over the Analytics target period (e.g., average, variance). This information refers to a time delay for completing the transmission of a specific data volume from UE to AF, or from AF to UE. If an expected number of iterations or an expected time interval between iterations is given in the request, the UE transmission latency performance can be provided as an average value of every data transmission latency performance within the Analytics target period, which is also provided in the request. |
| >> UL packet delay (NOTE 2) | The UL packet delay for the UE communicating with the application (e.g., average, variance). |
| >> DL packet delay (NOTE 2) | The DL packet delay for the UE communicating with the application (e.g., average, variance). |
| >> Round trip packet delay (NOTE 2) | The round trip packet delay for the UE communicating with the application (e.g. average, variance). |
| Aggregate latency performances (NOTE 2) | Aggregated transmission latency performance statistics for multiple UEs |
| > Latency classes (1 . . . max) (NOTE 3) | List with group of UEs classified by ranges of latency performance |
| >> Ratio/percentage of UEs per latency class | Percentage or ratio of UEs |
| >> Aggregate UL/DL/round trip packet delay per latency class | Aggregated statistical values of the corresponding UE latency statistics in the latency class (e.g. average, variance). |
| > Validity period | The validity period for the UE latency performance statistics as defined in clause 6.1.3. |

TABLE 6-continued

| Information | Description |
|---|---|
| > Geographical distribution of the UE(s) | If requested, a list of UEs per location information |
| > Maximum Packet Delay (NOTE 2) | Maximum packet delay for observed for UEs communicating with the application. |
| > Spatial Validity Condition | Area where the UE latency performance analytics applies. |
| Confidence | Confidence of this prediction. |

NOTE 1:
The item "Serving anchor UPF info" shall not be included if the consumer NF is an AF.
NOTE 2:
Analytics subset that can be used in "list of analytics subsets that are requested", "Preferred level of accuracy per analytics subset" and "Reporting Thresholds".
NOTE 3:
The number of latency classes may be pre-configured by the operator or provided by the service consumer via reporting thresholds.

Table 7 below shows NF services provided by the NWDAF.

TABLE 7

| Service Name | Service Operations | Operation Semantics | Example Consumer(s) |
|---|---|---|---|
| Nnwdaf_Analytics-Subscription | Subscribe | Subscribe/ Notify | PCF, NSSF, AMF, SMF, NEF, AF, OAM, CEF, NWDAF, DCCF |
| | Unsubscribe | | PCF, NSSF, AMF, SMF, NEF, AF, OAM, CEF, NWDAF, DCCF |
| | Notify | | PCF, NSSF, AMF, SMF, NEF, AF, OAM, CEF, NWDAF, DCCF, MFAF |
| | Transfer | Request/ Response | NWDAF |
| NnwdafAnalytics-Info | Request | Request/ Response | PCF, NSSF, AMF, SMF, NEF, AF, OAM, CEF, NWDAF, DCCF |
| | Context-Transfer | Request/ Response | NWDAF |
| NnwdafData-Management | Subscribe Notify | Subscribe/ Notify | NWDAF, DCCF, NWDAF, DCCF, MFAF, ADRF |
| | Fetch | Request/ Response | NWDAF, DCCF, MFAF, ADRF |
| Nnwdaf_MLModel-Provision | Subscribe Unsubscribe Notify | Subscribe/ Notify | NWDAF NWDAF NWDAF |
| Nnwdaf_MLModel-Info | Request | Request/ Response | NWDAF |

NOTE 1:
How OAM consumes Nnwdaf services and which Analytics information is relevant is defined in TS 28.550 [7] Annex H and out of the scope of this TS.
NOTE 2:
How CEF consumes Nnwdaf services and which Analytics information is relevant is defined in TS 28.201 [21] and out of the scope of this TS.
NOTE 3:
The Nnwdaf_MLModelProvision service and the Nnwdaf_MLModel Info service are provided by an NWDAF containing MTLF and consumed by an NWDAF containing AnLF.

Table 8 below shows analytics provided by the NWDAF.

TABLE 8

| Analytics Information | Request Description | Response Description |
|---|---|---|
| Slice Load level information | Analytics ID: load level information | Load level provided as number of UE registrations and number of PDU sessions for a Network Slice and Network Slice instances as well as resource utilization for Network Slice instances. |
| Observed Service experience information | Analytics ID: Service Experience | Observed Service experience statistics or predictions may be provided for a Network Slice or an Application. They may be derived from an individual UE, a group of UEs or any UE. For slice service experience, they may be derived from an Application, a set of Applications or all Applications on the Network Slice. |
| NF Load information | Analytics ID: NF load information | Load statistics or predictions information for specific NF(s). |
| Network Performance information | Analytics ID: Network Performance | Statistics or predictions on the load in an Area of Interest; in addition, statistics or predictions on the number of UEs that are located in that Area of Interest. |

TABLE 8-continued

| Analytics Information | Request Description | Response Description |
|---|---|---|
| UE mobility information | Analytics ID: UE Mobility | Statistics or predictions on UE mobility. When visited AOI(s) is included in the Analytics Filter information, only statistics on UE mobility can be provided. |
| UE Communication information | Analytics ID: UE Communication | Statistics or predictions on UE communication. |
| Expected UE behavioural parameters | Analytics ID: UE Mobility and/or UE Communication | Analytics on UE Mobility and/or UE Communication. |
| UE Abnormal behaviour information | Analytics ID: Abnormal behaviour | List of observed or expected exceptions, with Exception ID, Exception Level and other information, depending on the observed or expected exceptions. |
| User Data Congestion information | Analytics ID: User Data Congestion | Statistics or predictions on the user data congestion for transfer over the user plane, for transfer over the control plane, or for both. |
| UE Latency Performance | Analytics ID: UE Latency Performance | Statistics or predictions on UE latency performance |
| QoS Sustainability | Analytics ID: QoS Sustainability | For statistics, the information on the location and the time for the QoS change and the threshold(s) that were crossed; or, for predictions, the information on the location and the time when a potential QoS change may occur and what threshold(s) may be crossed. |
| Session Management Congestion Control Experience | Analytics ID: Session Management Congestion Control Experience | Statistics on session management congestion control experience for specific DNN and/or S-NSSAI. |
| Redundant Transmission Experience | Analytics ID: Redundant Transmission Experience | Statistics or predictions aimed at supporting redundant transmission decisions for URLLC services. |
| WLAN performance | Analytics ID: WLAN performance | Statistics or predictions on WLAN performance of UE. |
| Dispersion | Analytics ID: UE Dispersion | Statistics or predictions that identify the location (i.e. areas of interest) or network slice(s) where a UE, or a group of UEs disperse their data volume, or disperse mobility or session management transactions or both. |
| DN Performance | Analytics ID: DN Performance | Statistics or predictions on user plane performance for a specific Edge Computing application. |

Figure 4:
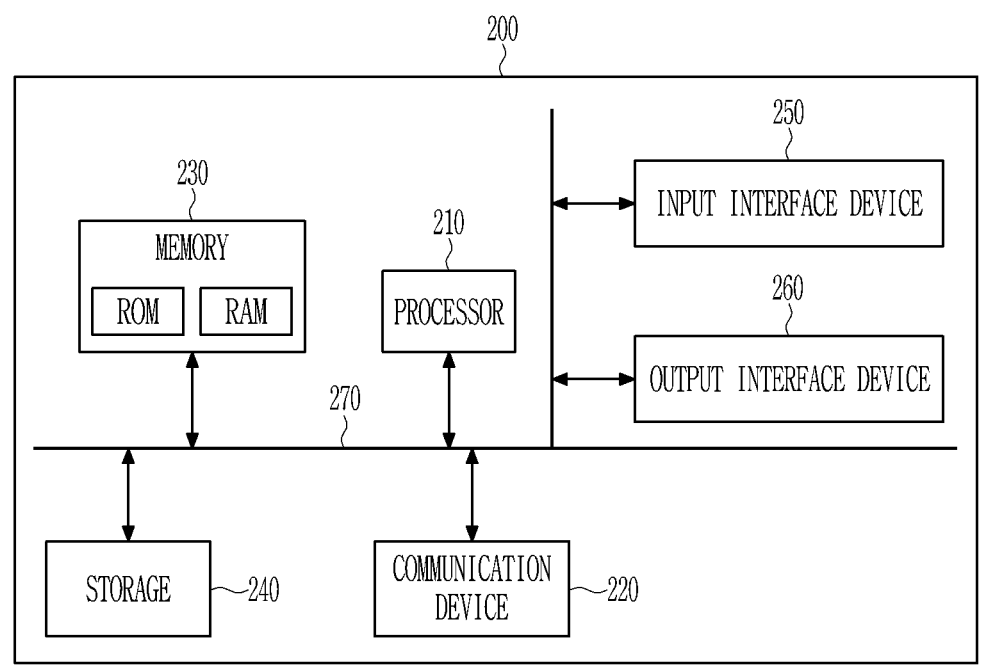
FIG. 4 is a block diagram illustrating a network function according to an embodiment.

FIG. 4 is a block diagram illustrating a network function according to an embodiment.

The network function according to embodiments may be implemented as a computer system, for example, a computer-readable medium. Referring to FIG. 4, the computer system 200 may include at least one of a processor 210, a memory 230, an input interface device 250, an output interface device 260, and a storage device 240 communicating through a bus 270. The computer system 200 may also include a communication device 220 coupled to the network. The processor 210 may be a central processing unit (CPU) or a semiconductor device that executes instructions stored in the memory 230 or the storage device 240. The memory 230 and the storage device 240 may include various forms of volatile or nonvolatile storage media. For example, the memory may include read only memory (ROM) or random-access memory (RAM). In the embodiment of the present disclosure, the memory may be located inside or outside the processor, and the memory may be coupled to the processor through various means already known. The memory is a volatile or nonvolatile storage medium of various types, for example, the memory may include read-only memory (ROM) or random-access memory (RAM).

Accordingly, the embodiment may be implemented as a method implemented in the computer, or as a non-transitory computer-readable medium in which computer executable instructions are stored. In an embodiment, when executed by a processor, the computer-readable instruction may perform the method according to at least one aspect of the present disclosure.

The communication device 220 may transmit or receive a wired signal or a wireless signal.

On the contrary, the embodiments are not implemented only by the apparatuses and/or methods described so far, but may be implemented through a program realizing the function corresponding to the configuration of the embodiment of the present disclosure or a recording medium on which the program is recorded. Such an embodiment can be easily implemented by those skilled in the art from the description of the embodiments described above. Specifically, methods (e.g., network management methods, data transmission methods, transmission schedule generation methods, etc.) according to embodiments of the present disclosure may be implemented in the form of program instructions that may be executed through various computer means, and be recorded in the computer-readable medium. The computer-readable medium may include program instructions, data files, data structures, and the like, alone or in combination. The program instructions to be recorded on the computer-readable medium may be those specially designed or constructed for the embodiments of the present disclosure or may be known and available to those of ordinary skill in the computer software arts. The computer-readable recording medium may include a hardware device configured to store and execute program instructions. For example, the computer-readable recording medium can be any type of storage media such as magnetic media like hard disks, floppy disks, and magnetic tapes, optical media like CD-ROMs, DVDs, magneto-optical media like floptical disks, and ROM, RAM, flash memory, and the like.

Program instructions may include machine language code such as those produced by a compiler, as well as high-level language code that may be executed by a computer via an interpreter, or the like.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software. The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers.

A computer program(s) may be written in any form of a programming language, including compiled or interpreted languages, and may be deployed in any form including a stand-alone program or a module, a component, a subroutine, or other units suitable for use in a computing environment.

A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random-access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks.

Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium.

A processor and a memory may be supplemented by, or integrated into, a special purpose logic circuit. The processor may run an operating system 08 and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements.

For example, a processor device may include multiple processors or a processor and a controller. In addition, different processing configurations are possible, such as parallel processors. Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment.

Features described in the specification in the context of individual example embodiments may be implemented as a combination in a single example embodiment. In contrast, various features described in the specification in the context of a single example embodiment may be implemented in multiple example embodiments individually or in an appropriate sub-combination.

Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

While this disclosure has been described in connection with what is presently considered to be practical example embodiments, it is to be understood that this disclosure is not limited to the disclosed embodiments.

On the contrary, it is intended to cover various modifications and equivalent arrangements included within the spirit and scope of the appended claims.

While this invention has been described in connection with what is presently considered to be practical embodiments, it is to be understood that the invention is not limited to the disclosed embodiments. On the contrary, it is intended to cover various modifications and equivalent arrangements included within the spirit and scope of the appended claims.

What is claimed is:

1. A network data analytics function (NWDAF) in a core network, comprising:
    a processor, a memory, and a communication device, wherein the processor executes a program stored in the memory to perform:
    receiving a request for analytics in user equipment (UE) level granularity from an application function (AF);
    collecting data from at least one UE, a network function (NF), and OAM (operations, administration, and maintenance) in the core network; and
    providing the analytics derived based on the data to the AF,
    wherein, when collecting the data, the processor performs
    collecting, from the OAM at the UE level granularity, packet delay for downlink (DL) and uplink (UL) per radio access bearer (RAB)/data radio bearer (DRB) per UE, and packet loss rate for the DL and the UL per the RAB/DRB.

2. The NWDAF of claim 1, wherein when collecting the data, the processor performs
    collecting RAN Throughput per UE and QoS flow retainability per UE from the OAM.

3. The NWDAF of claim 1, wherein when collecting the data, the processor performs
    collecting, from the OAM at the UE level granularity, at least one of throughput for downlink (DL) and uplink (UL) per UE, packet delay for the DL and the UL per radio access bearer (RAB)/data radio bearer (DRB) per UE, and packet loss rate for the DL and the UL per the RAB/DRB.

4. The NWDAF of the claim 1, wherein when collecting the data, the processor performs
    collecting, from the at least one UE, quality of experience (QoE) metric about either success rate of model distribution or upload success rate of results of local update.

5. The NWDAF of claim 1, wherein when collecting the data, the processor performs
    collecting, from the AF, a customized mean opinion score (MOS) about either success rate of model distribution or upload success rate of results of local update.

6. The NWDAF of claim 1, wherein when receiving the request for analytics in the UE level granularity from the AF, the processor performs
    receiving the request for the analytics from the AF in the core network.

7. The NWDAF of claim 6, wherein when providing the analytics derived based on the collected data to the AF, the processor performs
    providing the analytics derived based on the data to the AF.

* * * * *